(12) United States Patent
Moulsley et al.

(10) Patent No.: US 9,883,508 B2
(45) Date of Patent: *Jan. 30, 2018

(54) METHOD FOR COMMUNICATING IN A MOBILE NETWORK

(71) Applicant: KONINKLIJKE PHILIPS N.V., Eindhoven (NL)

(72) Inventors: Timothy James Moulsley, Caterham (GB); Choo Chiap Chiau, Shanghai (CN); Milos Tesanovic, Surrey (GB); Robert James Davies, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 57 days.

This patent is subject to a terminal disclaimer.

(21) Appl. No.: 15/350,194

(22) Filed: Nov. 14, 2016

(65) Prior Publication Data
US 2017/0064709 A1 Mar. 2, 2017

Related U.S. Application Data

(63) Continuation of application No. 13/380,113, filed as application No. PCT/IB2010/052673 on Jun. 15, 2010, now Pat. No. 9,497,005.

(30) Foreign Application Priority Data

Jun. 25, 2009 (EP) ..................................... 09163832

(51) Int. Cl.
*H04L 5/00* (2006.01)
*H04W 72/04* (2009.01)

(52) U.S. Cl.
CPC ....... *H04W 72/0446* (2013.01); *H04L 5/0044* (2013.01); *H04L 5/0053* (2013.01);
(Continued)

(58) Field of Classification Search
CPC ............. H04W 72/042; H04W 72/044; H04W 72/0446; H04L 5/0044; H04L 7/0053; H04L 7/0092
See application file for complete search history.

(56) References Cited

U.S. PATENT DOCUMENTS 8,165,085 B2  4/2012  Nishio et al.
8,385,281 B2  2/2013  Pan
(Continued)

FOREIGN PATENT DOCUMENTS

EP  1959706 A2  8/2008
WO  0022866 A1  4/2000

OTHER PUBLICATIONS

"3rd Generation Partnership Project; Technical Specification Group Radio Access Network; Evolved Universal Terrestrial Radio Access (E-UTRA); Physical Layer Procedures (Release 8)" 3GPP TS 36.213 V8.2.0 (Mar. 2008), Mar. 2008, 30 Page Document, Retrieved From the Internat: http://www.3gpp.org/ftp/specs/html-info/36213.htm>, on Mar. 12, 2009, 30 Page Document.
(Continued)

*Primary Examiner* — Parth Patel
*Assistant Examiner* — Kai Chang

(57) ABSTRACT

The present invention relates to a method or communicating between a primary station and a plurality of secondary stations, comprising
the primary station providing a plurality of resource sets,
the primary station configuring a secondary station to search for a control channel on at least one of a plurality of search spaces each corresponding to a resource set, wherein at least part of one of the search spaces is used to transmit a control message to a secondary station, the control message being indicative of a resource allocated to the secondary station for transmitting to the primary station or receiving from the primary station data, and wherein the
(Continued)

secondary station deduces from the part of the search space used for transmitting the control message an indication of the resource set from the plurality of resource sets within which the allocated resource is located.

34 Claims, 1 Drawing Sheet

(52) U.S. Cl.
CPC ......... *H04L 5/0092* (2013.01); *H04W 72/042* (2013.01); *H04W 72/044* (2013.01)

(56) References Cited

U.S. PATENT DOCUMENTS

| | | | |
|---|---|---|---|
| 8,385,960 B2 | 2/2013 | Skoric | |
| 8,526,963 B2 | 9/2013 | Ji | |
| 8,576,791 B2 | 11/2013 | Luo | |
| 8,625,509 B2 | 1/2014 | Ahn et al. | |
| 8,885,582 B2 | 11/2014 | Yamada | |
| 8,923,875 B2 | 12/2014 | Frederiksen | |
| 8,948,092 B2 | 2/2015 | Heo | |
| 9,497,005 B2* | 11/2016 | Moulsley | H04L 5/0044 |
| 2003/0086384 A1 | 5/2003 | Kwon | |
| 2008/0049692 A1 | 2/2008 | Bachu et al. | |
| 2008/0225783 A1 | 9/2008 | Wang et al. | |
| 2009/0022097 A1 | 1/2009 | Yoon | |
| 2009/0022110 A1 | 1/2009 | Muharemovic et al. | |
| 2009/0221284 A1 | 9/2009 | Kim et al. | |
| 2009/0268630 A1 | 10/2009 | Yellin et al. | |
| 2010/0061345 A1 | 3/2010 | Wengerter | |
| 2010/0279628 A1 | 11/2010 | Love | |
| 2010/0303028 A1 | 12/2010 | Gresset et al. | |
| 2010/0303052 A1 | 12/2010 | Visuri et al. | |
| 2011/0021206 A1* | 1/2011 | Baker | H04L 5/0053 455/450 |
| 2011/0021229 A1* | 1/2011 | Skoric | H04W 72/0406 455/507 |
| 2011/0053603 A1 | 3/2011 | Luo | |
| 2011/0085536 A1 | 4/2011 | Taoka | |
| 2011/0103509 A1 | 5/2011 | Chen | |
| 2011/0230200 A1 | 9/2011 | Dimou | |
| 2011/0243090 A1* | 10/2011 | Grovlen | H04L 1/18 370/329 |
| 2011/0273996 A1 | 11/2011 | Kim et al. | |
| 2011/0274077 A1 | 11/2011 | Yamada et al. | |
| 2011/0299489 A1 | 12/2011 | Kim et al. | |
| 2012/0008586 A1 | 1/2012 | Kwon et al. | |
| 2013/0077587 A1 | 3/2013 | Kwak | |
| 2015/0023300 A1 | 1/2015 | Baker | |

OTHER PUBLICATIONS

Panasonic: "PDCCH Design for Carrier Aggregation", 3GPP TSG RAN WG1 Meeting #57, R1-092230, San Francisco, USA, May 4-8, 2009, 9 Page Document.

Panasonic: "PDCCH Coding and Mapping for Carrier Aggregation", 3GPP TSG-RAN WG1 Meeting #56BIS; R1-091168, Seoul, Dorea, Mar. 23-27, 2009, 5 Page Document.

Research in Motion, "Carrier Indication for Carrier Aggregation", EGPP TSG RAN WG1 Meeting #57B, R1-092417, 2009, pp. 1-4.

* cited by examiner

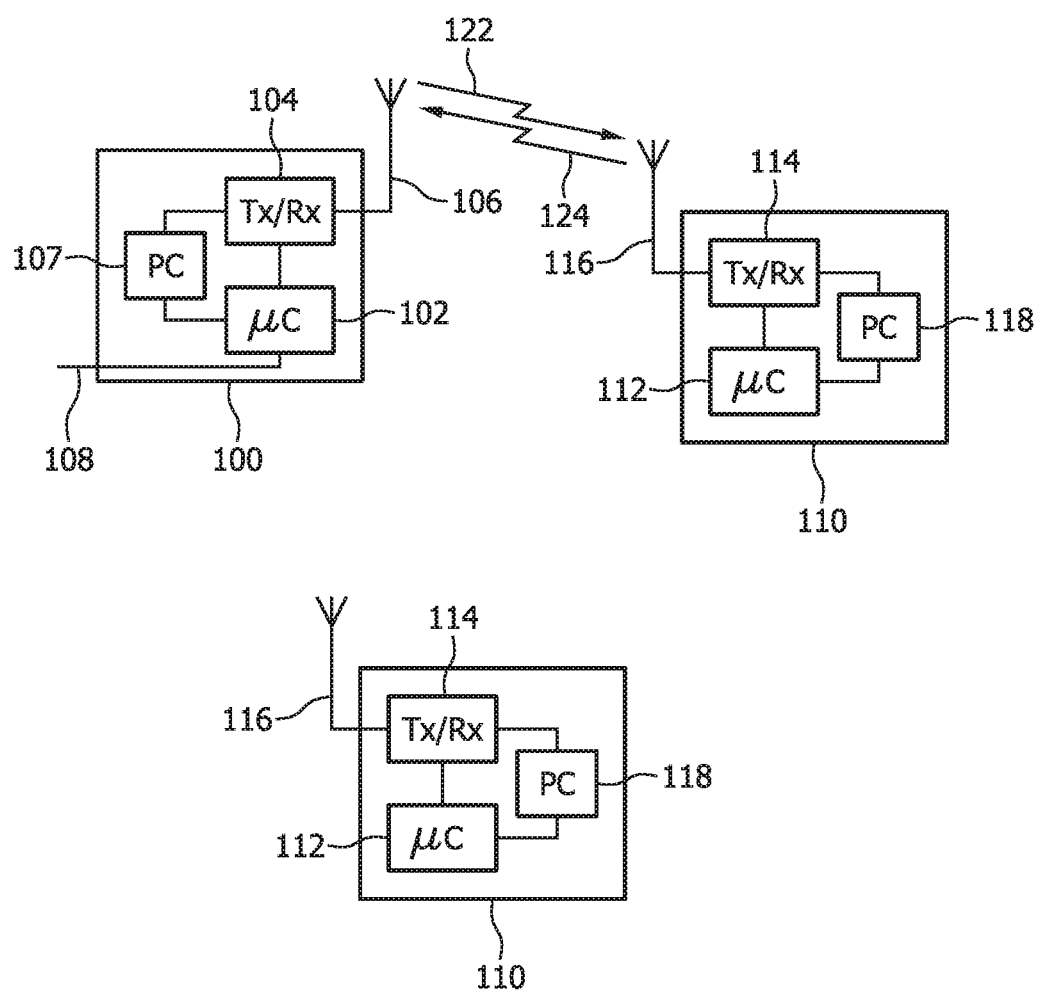

METHOD FOR COMMUNICATING IN A MOBILE NETWORK

CROSS-REFERENCE TO PRIOR APPLICATIONS

This application claims the benefit or priority of and describes relationships between the following applications: wherein this application is a continuation of U.S. patent application Ser. No. 13/380,113, filed Dec. 22, 2011, which is the National Stage of International Application No. PCT/IB2010/052673, filed Jun. 15, 2010, which claims the priority of foreign application EP09163832.0 filed Jun. 25, 2009, all of which are incorporated herein in whole by reference.

FIELD OF THE INVENTION

The present invention relates to a method for communicating in a network. More specifically, the present invention relates to communication between a primary station and a secondary station, in a telecommunication network, like a cellular telecommunication network (e.g. UMTS, UMTS LTE, GSM).

BACKGROUND OF THE INVENTION

In a mobile network, as e.g. UMTS LTE, the downlink control channel PDCCH (Physical Downlink Control Channel) carries information such as resource allocation for uplink or downlink transmission. A PDCCH message can use 1, 2, 4 or 8 Channel Control Elements (CCEs or resource elements)—referred to as CCE aggregation levels 1, 2, 4 or 8.

A mobile station, like a UE in LTE, does not know in advance the location in CCE space of messages intended for it. In principle, the mobile station could attempt to blindly decode all the possible PDCCHs with different starting positions in the CCE space and thus receive any messages intended for that mobile station. However, if the CCE space is large the processing complexity is prohibitive. Therefore a more limited search is configured which consists of a number of search spaces.

A search space is a set of aggregated CCEs (with a certain aggregation level) within which a mobile station (or user equipment (UE) or secondary station) performs blind decoding of all PDCCH payloads possible for that aggregation level. Search spaces are defined per aggregation level; a secondary station thus can have up to four search spaces. For example, the search space of a UE for aggregation level 1 (referred to as 1-CCE) could consist of the CCEs indexed 3,4,5,6,7,8, while its search space for aggregation level 8 could consist of the two resource sets of aggregated CCEs consisting of the CCEs indexed by 1, 2, . . . 8 and 9, 10, . . . , 16, respectively. In this example, the UE thus performs six blind decodings for 1-CCEs and two blind decodings for 8-CCEs.

The LTE specification currently requires the UE to perform the following:
  6 decoding attempts of 1-CCE aggregation
  6 decoding attempts of 2-CCE aggregation
  2 decoding attempts of 4-CCE aggregation
  2 decoding attempts of 8-CCE aggregation The larger aggregations are intended to be used for large messages, and/or small messages when a lower code rate is required, for example under bad channel conditions. However, restricting the search spaces to reduce processing complexity limits the availability of suitable aggregations for different conditions as conditions vary.

In order to reduce the required amount of signaling, it however needed to improve the current control channel, and more specifically for the grant of resources, either for uplink resources, i.e. from the User Equipment to the eNodeB or for downlink resources, i.e. from the eNodeB to the User Equipment.

SUMMARY OF THE INVENTION

It is an object of the invention to propose a method of communication which alleviates the above mentioned problem.

It is another object of the invention to provide a method enabling to improve the control channel scheme having search spaces, without causing more signalling or overhead.

In accordance with a first aspect of the invention, a method is proposed for communicating between a primary station and a plurality of secondary stations, comprising
  the primary station providing a plurality of resource sets,
  the primary station configuring a secondary station to search for a control channel on at least one of a plurality of search spaces each corresponding to a resource set, wherein at least part of one of the search spaces is used to transmit a control message to a secondary station, the control message being indicative of a resource allocated to the secondary station for transmitting to the primary station or receiving from the primary station data, and wherein the secondary station deduces from the part of the search space used for transmitting the control message an indication of the resource set from the plurality of resource sets within which the allocated resource is located.

In accordance with a second aspect of the invention, it is proposed a secondary station comprising means for communicating with a primary station, the secondary station comprising
  control means for activating a search for a control channel on at least one of a plurality of search spaces each corresponding to a resource set, wherein at least part of one of the search spaces may be used to transmit a control message to the secondary station from the primary station, the control message being indicative of a resource allocated to the secondary station for transmitting to the primary station or receiving from the primary station data, and wherein the control means are arranged for deducing from the part of the search space used for transmitting the control message an indication of the resource set from the plurality of resource sets within which the allocated resource is located.

In accordance with a third aspect of the invention, it is proposed a primary station comprising means for communicating with a plurality of secondary stations, comprising
  control means for providing a plurality of resource sets,
  the control means being arranged for configuring a secondary station to search for a control channel on at least one of a plurality of search spaces each corresponding to a resource set, wherein at least part of one of the search spaces is used to transmit a control message to a secondary station, the control message being indicative of a resource allocated to the secondary station for transmitting to the primary station or receiving from the primary station data, and wherein the part of the search space used for transmitting the control message is selected to provide to the secondary station with an indication of the resource set from the plurality of resource sets within which the allocated resource is located.

Thus, the secondary station is able to deduce without additional signalling the location of an allocated resource. The message may contain all the remaining information required to fully specify the granted resource.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawing, wherein:

FIG. 1 is a block diagram of a system in which the invention is implemented.

DETAILED DESCRIPTION OF THE INVENTION

The present invention relates to a method for communicating in a network, like a cellular network. For instance, the network may be a UMTS network as depicted on FIG. 1.

Referring to FIG. 1, a radio communication system in accordance with the invention comprises a primary station (BS or eNodeB) 100 and a plurality of secondary stations (MS or UE) 110. The primary station 100 comprises a microcontroller (µC) 102, transceiver means (Tx/Rx) 104 connected to antenna means 106, power control means (PC) 107 for altering the transmitted power level, and connection means 108 for connection to the PSTN or other suitable network. Each UE 110 comprises a microcontroller (µC) 112, transceiver means (Tx/Rx) 114 connected to antenna means 116, and power control means (PC) 118 for altering the transmitted power level. Communication from primary station 100 to mobile station 110 takes place on downlink channels, while communication from secondary station 110 to primary station 100 takes place on uplink channels. In this example, the downlink channels comprise control channels, like PDCCH. Such control channels may be transmitted over a plurality of carriers. These carriers may be defined by frequency carriers or in a variant of the invention, coding modulation.

The first embodiment of the invention provides an efficient scheme for signaling grant of resources, either uplink resources or downlink resources, which may be transmitted on multiple carriers for a communication system such as LTE or LTE Advanced.

In fact, in the first release of the LTE specifications (Rel-8), a single carrier of up to 20 MHz is used. A control signalling message on the Physical Downlink Control Channel (PDCCH) is used to signal allocations of transmission resources. Each User Equipment is configured with a search space within which to search for such signalling messages, in order to avoid having to decode every possible location in every subframe, which would result in a very large blind decoding overhead. However, in future extensions of LTE to multiple carriers, signalling will be needed to indicate resource allocations on each of the component carriers. It is desirable to avoid a significant increase in the number of blind decodes required. The current main option considered in 3GPP is to have separate PDCCHs for each Component Carrier (CC) where either:

One PDCCH indicates an allocation on the same CC or
One PDCCH indicates an allocation on the same or a different CC It is therefore beneficial in either case for there to be a search space for PDCCH messages on each carrier (i.e. a set of possible locations for a PDCCH in each of which the UE attempts to decode a PDCCH (i.e. blind decoding).

However, the further details are not defined.

In general, it would be desirable for the UE to be able to receive a PDCCH on any of the CCs (and typically more than one PDCCH at the same time).

In order to avoid too great an increase in signal processing due to the total number of blind decodes, the search space on each carrier should be kept as small as possible.

Currently in Release 8, the position of the UE-specific search space for PDCCH for a given UE changes from subframe to subframe according to the following in TS36.213:

"The set of PDCCH candidates to monitor are defined in terms of search spaces, where a search space $S_k^{(L)}$ at aggregation level $L \in \{1,2,4,8\}$ is defined by a set of PDCCH candidates. The CCEs corresponding to PDCCH candidate m of the search space $S_k^{(L)}$ are given by $$L \cdot \{(Y_k + m) \bmod \lfloor N_{CCE,k}/L \rfloor\} + i$$

where $Y_k$ is defined below, $i=0, \ldots, L-1$ and $m=0, \ldots, M^{(L)}-1$. $M^{(L)}$ is the number of PDCCH candidates to monitor in the given search space.

For the UE-specific search space $S_k^{(L)}$ at aggregation level L, the variable $Y_k$ is defined by $$Y_k = (A \cdot Y_{k-1}) \bmod D$$

where $Y_{-1} = n_{RNTI} \neq 0$, $A=39827$, $D=65537$ and $k = \lfloor n_s/2 \rfloor$, $n_s$ is the slot number within a radio frame. The RNTI value used for $n_{RNTI}$ is defined in section 7.1 in downlink and section 8 in uplink."

The RNTI value is specific to the UE, and the aggregation level is 1, 2, 4 or 8.

There is also a Common search space (starting at CCE zero) intended for broadcast control messages to a number of UEs.

More details of the search spaces are given in the Table below showing the PDCCH candidates monitored by a UE in Release 8. Search space $S_k^{(L)}$

| Type | Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

If the UE-specific search space per carrier is reduced (as is likely to be required for the case of multiple carriers), then there is a significant probability that it will collide with either a part of the common search space or the search space of another UE. This may lead to blocking of the control channel, preventing the eNB scheduling the desired DL and/or UL transmissions and thus a loss of performance (e.g. throughput or QoS). A possible set of search spaces for additional carriers is given in the table below (on the assumption that there is no common search space on additional carriers) and which shows the possible PDCCH candidates monitored by a UE (Release 10, additional carriers only).

| Search space $S_k^{(L)}$ | | | Number of PDCCH |
|---|---|---|---|
| Type | Aggregation level L | Size [in CCEs] | candidates $M^{(L)}$ |
| UE-specific | 1 | 2 | 2 |
| | 2 | 4 | 2 |
| | 4 | 8 | 2 |
| | 8 | 16 | 2 |

Providing two possible locations for PDCCH candidates allows for two PDDCHs to be sent to a UE in the same subframe, for example, one carrying an UL grant and the other a DL resource allocation.

Currently in Release 8 it is assumed that in FDD operation the Uplink and Downlink carriers are paired. This means that an UL grant transmitted using a PDCCH on a given Downlink carrier implicitly indicates a particular UL carrier. In the case of carrier aggregation, we can consider the following cases:

Either the number of DL carriers is equal to or greater than the number of UL carriers, which means that a one-to-one association can be created between each UL carrier and a DL carrier, and all the DL carriers which are part of such an association can carry PDCCH, then it would not be necessary to use any additional signaling such as a carrier indicator to signal UL grants on any of the UL carriers; or The number of DL carriers is less than the number of UL carriers. In this case, signaling UL grants on at least some of the carriers would require some additional signaling mechanism.

Several solutions inferring additional signalling have been searched by the applicants:

Carrier indicator field
  This would allow more scheduling flexibility even in the case of symmetric UL/D1 carriers
  This would introduce a new DCI format
PDCCH CRC scrambled by a different ID
  This would reduce the available ID space
    To check the additional ID(s), more blind decodings would be needed (but not more than the upper limit for case (1))

In all the above cases, the search space would need to be sufficiently large to accommodate additional PDCCH(s), since PDCCHs for more than one UL grant could need to be present on the same DL carrier.

It seems likely that some UE-specific configuration (probably semi-static) would be needed to explicitly link UL carriers to DL carriers.

In accordance with a current definition of the invention, its first embodiment is based on the recognition that the carrier to which the UL grant or DL resource allocation applies may be indicated by the PDCCH location within the search space.

The first embodiment comprises a system like LTE, but with multiple carriers. To save processing power, each User Equipment monitors only a limited set of PDCCH locations on a given carrier (as a function of UE ID, subframe number, size of message, and amount of resource available for control channel signalling). On one carrier (the anchor carrier, carrier 0), with message size (aggregation level) is 1, the PDCCH search space size is 6 and the number of UL carriers is 5 and the number of DL carriers is also 5.

As an example, the relationship between PDCCH location (within the search space for that UE) and the particular carrier could be indicated as in the Table below.

| PDCCH position | Indicated UL carrier (for PDDCH with UL grant) | Indicated DL carrier (for PDCCH with DL resource allocation) |
|---|---|---|
| 0 | 0 | 0 |
| 1 | 1 | 1 |
| 2 | 2 | 2 |
| 3 | 3 | 3 |
| 4 | 4 | 4 |
| 5 | 0 | 0 |

The position of the PDCCH in a search space can be defined as the resource used within a search space. The space can be defined along at least two dimensions, like the components on a first axis, and the timeslots on a second axis. It is to be noted that some other parameters could be taken into account like the cell, if the invention is implemented in a multi cell co-operative system. In such a system, a plurality of antenna ports belonging to different cells are used simultaneously and in a cooperative manner.

Depending on the timeslot and/or the carrier (or other parameters) used for the transmission of the allocation grant, the secondary station can deduce an information on the resouce allocated, like a position in the resource sets, i.e. a carrier, or a timeslots or likewise.

The mapping between location and carrier could be configured by the network. As an example, to provide more scheduling flexibility on the anchor carrier (Carrier 0), not all carriers could be indicated by PDCCH on the anchor carrier. For example:

| PDCCH position | Indicated carrier UL (for PDDCH with UL grant) | Indicated DL carrier (for PDCCH with DL resource allocation) |
|---|---|---|
| 0 | 0 | 0 |
| 1 | 1 | 1 |
| 2 | 2 | 2 |
| 3 | 0 | 0 |
| 4 | 0 | 0 |
| 5 | 0 | 0 |

A second embodiment is like the first embodiment but has more component carriers in the UL (e.g., 5) and fewer in the DL (e.g. 2). In this case the mapping could be as follows on the additional carrier (carrier 1).

| PDCCH position | Indicated UL carrier (for PDDCH with UL grant) | Indicated DL carrier (for PDCCH with DL resource allocation) |
|---|---|---|
| 0 | 0 | 0 |
| 1 | 1 | 1 |
| 2 | 2 | 0 |
| 3 | 3 | 1 |
| 4 | 4 | 0 |
| 5 | 0 | 0 |

A third embodiment is like the first embodiment but with reduced PDCCH search space on the additional component carriers (i.e. non anchor carriers). Here the carrier is indicated as an offset with respect to the carrier on which the PDCCH appears. The table refers to non-anchor carriers (except for the last anchor carrier)

| PDCCH position | Indicated UL carrier offset (for PDDCH with UL grant) | Indicated DL carrier offset (for PDCCH with DL resource allocation) |
| --- | --- | --- |
| 0 | 0 | +1 |
| 1 | +1 | 0 |

Note that the mapping can be configured so that UL and DL resources can be indicated on matching carriers in the same subframe. In one case this would be the same carrier as that carrying the PDCCH (and corresponding UL). In the other case this would be the next carrier.

For the last anchor carrier we could have:

| PDCCH position | Indicated UL carrier offset (for PDDCH with UL grant) | Indicated DL carrier offset (for PDCCH with DL resource allocation) |
| --- | --- | --- |
| 0 | 0 | −1 |
| 1 | −1 | 0 |

A fourth embodiment is like the second embodiment, but with 5 carriers in UL and 3 carriers in DL. The search space on the non-anchor carriers is modified compared with the search space on the anchor carrier (carrier 0) but more blind decodings per carrier are allowed than in the third embodiment. For example on one additional carrier (Carrier 1) we could have:

| PDCCH position | Indicated UL carrier (for PDDCH with UL grant) | Indicated DL carrier (for PDCCH with DL resource allocation) |
| --- | --- | --- |
| 0 | 1 | 1 |
| 1 | 2 | 2 |
| 2 | 3 | 0 |
| 3 | 4 | 1 |

On the other additional carrier (Carrier 2) we could have:

| PDCCH position | Indicated UL carrier (for PDDCH with UL grant) | Indicated DL carrier (for PDCCH with DL resource allocation) |
| --- | --- | --- |
| 0 | 1 | 1 |
| 1 | 2 | 2 |
| 2 | 3 | 0 |
| 3 | 4 | 2 |

A fifth embodiment is like the third embodiment but where in order to give more flexibility the mapping between PDCCH position and carrier depends on the aggregation level. For aggregation level 1 we could have

| PDCCH position | Indicated UL carrier offset (for PDDCH with UL grant) | Indicated DL carrier offset (for PDCCH with DL resource allocation) |
| --- | --- | --- |
| 0 | 0 | +1 |
| 1 | +1 | 0 |

For aggregation level 2 we could have

| PDCCH position | Indicated UL carrier offset (for PDDCH with UL grant) | Indicated DL carrier offset (for PDCCH with DL resource allocation) |
| --- | --- | --- |
| 0 | −1 | +2 |
| 1 | +2 | −1 |

Part of the configuration of the mapping between PDDCH location may be fixed in the specification, for example as a default mapping in case no other mapping is signalled by higher layers.

Note that the PDCCH positions in the tables above are within the search space for a particular UE, which in general is located within a larger set of possible PDDCH locations The invention may also be applied to indicate that the resources signalled in a PDCCH refer to another cell (which may or may not have the same carrier frequency as the carrier on which the PDCCH is transmitted).

As an example of an embodiment for this case, a system like LTE is configured so that the UE may receive one or more PDCCH from a serving cell (Cell 0) and such PDCCH may also indicate resources in another cell (cell 1).

| PDCCH position | Indicated UL cell (for PDDCH with UL grant) | Indicated DL cell (for PDCCH with DL resource allocation) |
| --- | --- | --- |
| 0 | 0 | 1 |
| 1 | 1 | 0 |
| 2 | 0 | 1 |
| 3 | 1 | 0 |
| 4 | 0 | 1 |
| 5 | 1 | 0 |

In the table the entries are arranged so that it is easy to signal an UL and DL resource in the same cell at the same time. In addition it would be possible, for example, for two PDCCHs to be transmitted indicating that the UE should receive PDSCH transmissions from both cells 0 and 1 at the same time.

The invention may be applicable to mobile telecommunication systems like UMTS LTE and UMTS LTE-Advanced.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method of communicating between a primary station and a plurality of secondary stations, comprising the primary station configuring a plurality of resource sets, the primary station allocating at least one of a plurality of search spaces to a secondary station, wherein the secondary station is configured to search for a control channel on at least one of the plurality of search spaces, and wherein each of the plurality of search spaces corresponds to a resource set, wherein at least part of one of the plurality of search spaces is used to transmit a control message to the secondary station, the control message being indicative of a resource allocated to the secondary station for communicating with the primary station, and wherein the secondary station is configured to determine from the at least part of one of the plurality of search spaces used for transmitting the control message an indication of the resource set from the plurality of resource sets within which the allocated resource is located.

2. The method of claim 1, wherein the plurality of resource sets each comprises at least one of: a component carrier, a timeslot, and a cell.

3. The method of claim 1, wherein the plurality of resource sets comprise a plurality of component carriers, the control channel on at least one of the plurality of search spaces being distributed over the component carriers, and wherein the secondary station determines, based on a presence of the control channel on a specific component carrier, the indication of the resource set within which the allocated resource is located.

4. The method of claim 1, wherein the plurality of resource sets comprise a plurality of timeslots, the control channel search spaces being distributed over the timeslots, and wherein the secondary station determines, based on a presence of the control channel in a specific timeslot, the indication of the resource set within which the allocated resource is located.

5. The method of claim 1, wherein the plurality of resource sets comprise a plurality of cells, the control channel on at least one of the plurality of search spaces being distributed over the cells, and wherein the secondary station determines, based on a presence of the control channel in a specific cell the indication of the resource set within which the allocated resource is located.

6. The method of claim 1, wherein the allocated resource is selected from a plurality of component carriers, and wherein the indication of the resource set within which the allocated resource is located comprises an indication of which component carriers the allocated resource is located.

7. The method of claim 1, wherein the allocated resource is selected from a plurality of timeslots, and wherein the indication of the resource set within which the allocated resource is located comprises an indication of which timeslot the allocated resource is located.

8. The method of claim 1, wherein the allocated resource is selected from a plurality of cells, and wherein the indication of the resource set within which the allocated resource is located comprises an indication of which cell the allocated resource is located.

9. The method of claim 1, wherein the indication of the resource set is an absolute indication.

10. The method of claim 1, wherein the indication of the resource set is an offset value, compared to a reference resource set.

11. The method of claim 10, wherein the reference resource set is determined based on the resource set used for transmitting the control message.

12. The method of claim 1, wherein the secondary station determines, based on the resource set used for transmitting the control message, the indication of the resource set within which the allocated resource is located from a mapping table signalled by higher layer signalling.

13. The method of claim 1, wherein the secondary station determines, based on the part of the search space used for transmitting the control message, the indication of the resource set within which the allocated resource is located from a mapping table signalled by higher layer signalling.

14. A secondary station comprising
a transceiver; and
a control circuit operatively coupled to the transceiver, the microcontroller configured to search for a control channel on at least one of a plurality of search spaces each corresponding to a resource set, wherein at least part of one of the plurality of search spaces may be used to transmit a control message to the secondary station from a primary station, the control message being indicative of a resource allocated to the secondary station for communicating with the primary station, and wherein the control circuit is configured to determine from the at least part of one of the plurality of search spaces used for transmitting the control message an indication of the resource set from the plurality of resource sets within which the allocated resource is located.

15. The secondary station of claim 14, wherein the plurality of resource sets each comprises at least one of: a component carrier, a timeslot, and a cell.

16. The secondary station of claim 14, wherein the plurality of resource sets comprise a plurality of component carriers, the control channel on at least one of the plurality of search spaces being distributed over the component carriers, and wherein the control circuit determines, based on a presence of the control channel on a specific component carrier, the indication of the resource set within which the allocated resource is located.

17. The secondary station of claim 14, wherein the plurality of resource sets comprise a plurality of timeslots, the control channel search spaces being distributed over the timeslots, and wherein the control circuit determines, based on a presence of the control channel in a specific timeslot, the indication of the resource set within which the allocated resource is located.

18. The secondary station of claim 14, wherein the plurality of resource sets comprise a plurality of cells, the control channel on at least one of the plurality of search spaces being distributed over the cells, and wherein the control circuit determines, based on a presence of the control channel in a specific cell the indication of the resource set within which the allocated resource is located.

19. The secondary station of claim 14, wherein the allocated resource is selected from a plurality of component carriers, and wherein the indication of the resource set within which the allocated resource is located comprises an indication of which component carriers the allocated resource is located.

20. The secondary station of claim 14, wherein the allocated resource is selected from a plurality of timeslots, and wherein the indication of the resource set within which the allocated resource is located comprises an indication of which timeslot the allocated resource is located.

21. The secondary station of claim 14, wherein the allocated resource is selected from a plurality of cells, and wherein the indication of the resource set within which the allocated resource is located comprises an indication of which cell the allocated resource is located.

22. The secondary station of claim 14, wherein the indication of the resource set is an absolute indication.

23. The secondary station of claim 14, wherein the indication of the resource set is an offset value, compared to a reference resource set.

24. The secondary station of claim 23, wherein the reference resource set is determined based on the resource set used for transmitting the control message.

25. The secondary station of claim 14, wherein the control circuit determines, based on the resource set used for transmitting the control message, the indication of the resource set within which the allocated resource is located from a mapping table signalled by higher layer signalling.

26. The secondary station of claim 14, wherein the control circuit determines, based on the part of the search space used for transmitting the control message, the indication of the resource set within which the allocated resource is located from a mapping table signalled by higher layer signalling.

27. A primary station
   a transceiver; and
   a control circuit operatively coupled to the transceiver, the control circuit configured to configure a plurality of resource sets and indicate, via the transceiver, to
a secondary station, to search for a control channel on at least one of a plurality of search spaces each corresponding to a resource set, wherein at least part of one of the plurality of search spaces is used to transmit a control message to the secondary station, the control message being indicative of a resource allocated to the secondary station for communicating with the primary station, and wherein the at least part of one of the plurality of search spaces used for transmitting the control message is selected to provide to the secondary station with an indication of the resource set from the plurality of resource sets within which the allocated resource is located.

28. The primary station of claim 27, wherein the plurality of resource sets each comprises at least one of: a component carrier, a timeslot, and a cell.

29. The primary station of claim 27, wherein the allocated resource is selected from a plurality of component carriers, and wherein the indication of the resource set within which the allocated resource is located comprises an indication of which component carriers the allocated resource is located.

30. The primary station of claim 27, wherein the allocated resource is selected from a plurality of timeslots, and wherein the indication of the resource set within which the allocated resource is located comprises an indication of which timeslot the allocated resource is located.

31. The primary station of claim 27, wherein the allocated resource is selected from a plurality of cells, and wherein the indication of the resource set within which the allocated resource is located comprises an indication of which cell the allocated resource is located.

32. The primary station of claim 27, wherein the indication of the resource set is an absolute indication.

33. The primary station of claim 27, wherein the indication of the resource set is an offset value, compared to a reference resource set.

34. The primary station of claim 33, wherein the reference resource set is determined based on the resource set used for transmitting the control message.

* * * * *